United States Patent Office 3,280,228
Patented Oct. 18, 1966

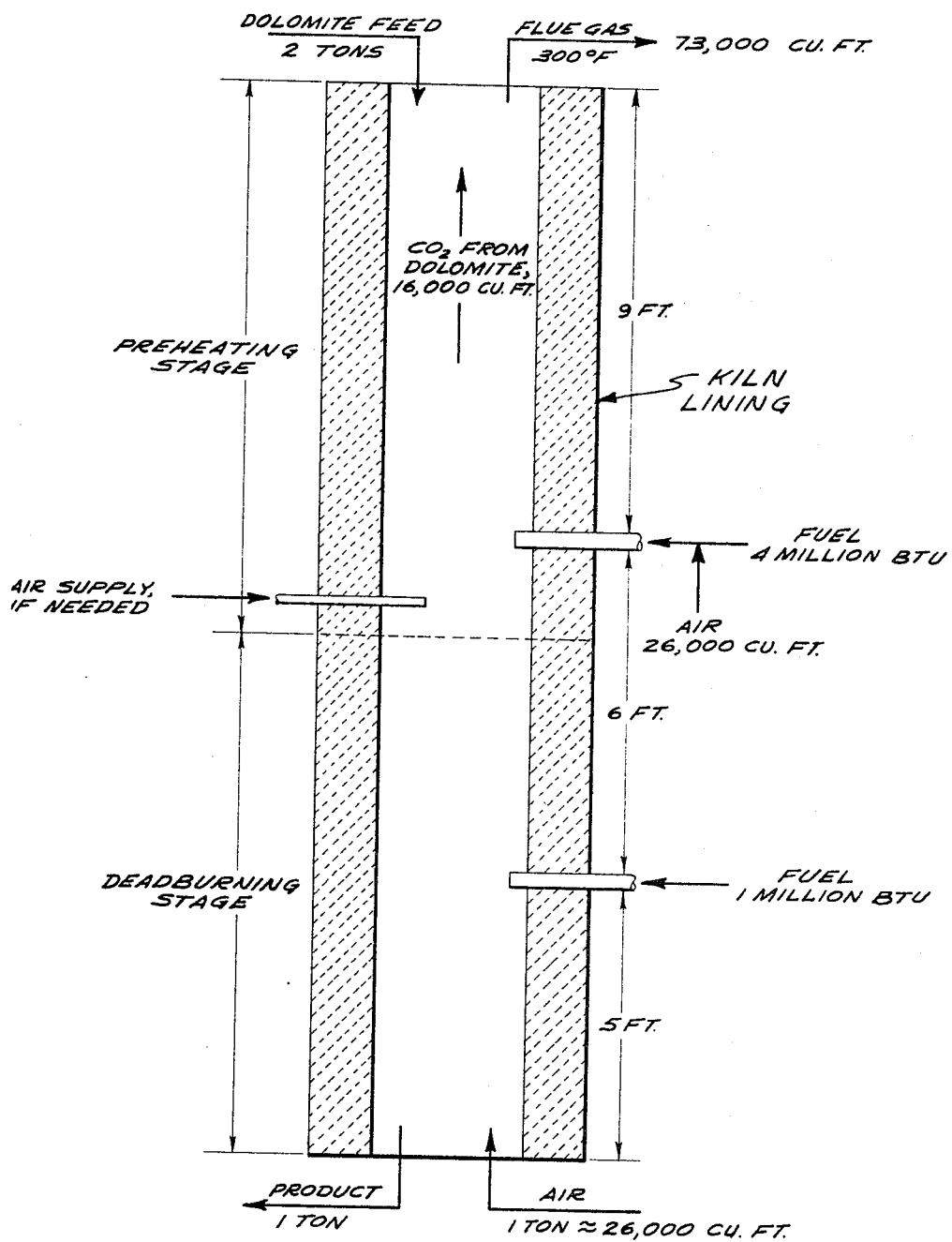

3,280,228
PRODUCTION OF DEAD BURNED REFRACTORY
GRAIN IN A SHAFT KILN
Albert H. Pack and William W. Campbell, Ludington, Mich., and Earl Leatham, Wexford, Pa., assignors to Harbison-Walker Refractories Company, Pittsburgh, Pa., a corporation of Pennsylvania
Filed Jan. 28, 1964, Ser. No. 340,678
5 Claims. (Cl. 263—53)

This invention relates to the production of dead burned refractory grain material of at least 97% MgO+CaO, by weight, and on the basis of an oxide analysis. It is among the objects of this invention to provide a method for production of that material by the firing of briquettes or pieces of material of the group magnesium hydrate, dolomite, magnesite and limestone or mixtures thereof in a shaft kiln, by a procedure that is simple and easily controlled, and which provides more uniformly dense refractory grain of low porosity.

It has been customary to produce dead burned magnesite, dead burned dolomite and hard burned lime in a rotary kiln from such materials as magnesium carbonate, magnesium hydroxide in bulk or unconsolidated form, dolomite (a naturally occurring mixture of magnesium carbonate and calcium carbonate in about a 1 to 1 molar ratio) and limestone (calcium carbonate). It has been proposed to achieve greater density and higher purity than is to be had with such rotary kiln products by dead burning the materials, just mentioned, in the form of briquettes. However, rotary kilns do not appear suited for this purpose, because the briquettes or softer pieces of material are damaged or destroyed by the tumbling action of the kiln, by the production of dust that is largely lost to the stack, and because of the fact that the product is lower in density than desired. Shaft kilns are more generally desirable for burning such briquetted material because of the inherently gentle handling of the charge as it passes down the kiln and also due to the high temperature obtainable in the hot zone of the kiln.

The successful operation of a shaft kiln depends primarily on the ability to move the charge or bed of briquettes at a constant rate down through the firing zone of the kiln, while inducing movement of a quantity of air upwardly through the kiln countercurrent to the movement of the bed. Of course, the firing zone must be maintained at a temperature sufficiently high to sinter and shrink the briquettes properly. The proper balance of countercurrent movement of air and feed has been thought to be governed by the porosity of the charge and the temperature of the firing zone. With a maintained uniform size of briquettes and a minimum amount of fine particles, the packing of the bed moving through the kiln will be such that litle difficulty is encountered in inducing the necessary amount of air flow through the descending load.

In attempts to dead burn dolomite, limestone or magnesium hydrate briquettes, or pieces of progenitor ore material, in accordance with what would be considered normal practice with a conventional shaft kiln, in which unfired briquettes are fed at the top and fired briquettes are discharged at the bottom, with an intermediate zone heated to a dead burning temperature using a fuel such as natural gas, and in which air is blown upwardly from the bottom of the kiln, we have found that as the briquettes or pieces of material calcine, they tend to soften and have a strong tendency to spall or break up into fines to such an extent that the load bridges over and will no longer move down the kiln, which condition requires cutting back the throughput of the kiln and reducing the amount of air blown in at the bottom of the kiln in order to get to load moving down the kiln again. The amount of air used during this time is insufficient for combustion of the fuel entering at the burning zone, and desired dead burning temperatures cannot be obtained or maintained. In a shaft kiln, where little or no combustion air is introduced through the burners, there must be sufficient air moving in through the bottom of the kiln to completely burn the fuel introduced at the burning zone and obtain a temperature above about 3,500° F., in order to obtain the desired density in the final product.

We have discovered, and it is upon this that our invention is in a large part predicated, that the foregoing difficulties can be overcome and continued satisfactory operation of the shaft kiln maintained, by attention to the physical characteristics of the briquettes fed to the kiln, by careful balance of air and fuel in relation to the briquette feed rate and most importantly by a judicious selection of the points of fuel injection into the kiln. More in detail, we have found that it is simple to maintain desired air velocity for dead burning temperatures of at least 3500° F. in the burning zone with minimal breakdown of the charge and the resulting bridging of the load by preheating the briquettes or pieces of material to a temperature of at least about 1600° F. and preferably, of at least 2000° F. in order to calcine and to initiate the sintering process in a relatively gentle manner, and by using such preheated briquettes as feed to the hot zone of the kiln. Fuel is introduced to the preheating zone and to the burning zone in a quantity sufficient to provide 4 million B.t.u.'s per ton of dead burned product for preheating and calcining and 1 million B.t.u.'s per ton for sintering. Air of ambient temperature is blown through the bottom of the kiln in a 1 to 1 weight ratio to the discharged product. Sufficient air is also introduced along with the fuel injected into the preheating or calcining zone to obtain substantially complete combustion of the fuel there introduced, with a minimal amount of oxygen in the flue gases.

The drawing is a schematic diagram, drawn approximately to scale, of a shaft kiln construction usable for the practice of this invention. The desired material balance is also indicated.

In a preferred embodiment, almond-shaped briquettes about 1.5 x 1.5 x 0.75" in dimension or pieces of progenitor ore material 2.0 to 2.5" in the largest dimension of at least 97% MgO+CaO content, by weight, and on the basis of an oxide analysis, are prepared from materials of the group dolomite, magnesite, brucite or magnesium hydrate and limestone or mixtures thereof. These materials may be natural or synthetic, either in the hydrate or the carbonate form. Reference to synthetic material, of course, describes such as magnesia recovered from seawater or more concentrated brines. These briquettes or pieces are fired in the preheating stage of a two-stage shaft kiln as shown in FIG. 1 to a temperature of at least about 1600° and preferably 2000° F. for a time sufficient to calcine and produce shrinkage to obtain a bulk specific gravity of at least 1.4. A range for the bulk specific gravity which is considered satisfactory is 1.4 to about 2.3. This initial burning may be in a kiln stage of approximately 10 feet vertical extent, and in which sufficient air is introduced into the burners along with the fuel to cause complete combustion with a minimum of excess air. The fuel required in this stage will be on the order of about 4 million B.t.u.'s per ton of product. About half of the air admitted to the kiln must be introduced with the fuel in this type of an initial operation.

While still at a temperature of above about 1600° F., the briquettes or pieces are fed to an additional shaft kiln stage, which can be, for example, on the order of about 10 feet in height, together with air at the rate of 1 pound per 1 pound of charge introduced through the bottom of the kiln. We have mentioned 1600° F. as a minimum for the initial briquette heat treatment. The temperature should be less than about 2200° F., and its primary purpose is to drive off free or combined water and carbon dioxide without causing extensive sintering of the briquettes. Fuel is introduced into the second or dead burning kiln stage at a rate of about 1 million B.t.u.'s per ton of dead burned product. This foregoing material and thermal balance provides a temperature of at least 3500° F. in the dead burning zone, and provides a dead burned product having a porosity uniformly normally less than 8%.

Another important feature of the instant invention is the remarkably low fuel consumption, as compared to previous methods of calcining and dead burning the materials discussed above. Not only that, much higher dead burning temperatures are accomplished while still being able to effectively control kiln operation. Dead burned grain, of the materials above discussed, produced in accordance with this invention, is particularly suited to the production of basic refractories, especially brick and other shapes of high density and low apparent porosity, as desired by rerfractory users.

The briquettes can be formed from the raw materials in any of a variety of different manners such as, for example, intimately admixing finely divided (all 325 mesh) material and charging to the well-known Komarek-Greaves double roll press to form pillow-shaped briquettes. These rolls should operate to exert on the order of at least about 10,000 pounds per linear inch on the material. It is often desirable to recycle a portion of the briquettes to the feed material of the briquette rolls to assure less breakage in the initial burning.

Crude dolomite and limestone rock can be dead burned by the process of this invention. However, the rock must analyze at least 97% MgO+CaO, on an oxide basis, must be of such particle size that at least 90% is ¼ to 2". Substantially 100% of the pieces should be ¼ to 2.5". These dimensions refer to the maximum diameter or width of a given particle. No sintering additions (such as $Fe_2O_3$, $Cr_2O_3$, $TiO_2$, $SiO_2$, etc.) are needed, although up to 3%, by weight, are permissible. The sized pieces must be preheated in the manner above discussed (1600 to 2000° F. and, before cooling, passed to the dead burning shaft kiln stage. The product is dead burned pieces of dolomite or limestone. We have obtained such dead burned lump dolomite of bulk specific gravity uniformly over 3.05. As far as we are aware, no one has previously been able to obtain a bulk specific gravity as high as 3.0 on high purity dolomite without the addition of sintering aids.

Our dead burned lump dolomite is very hard, and weathers surprisingly well. Pieces of progenitor dolomite ore, processed in a pilot plant test of the above process, were allowed to weather in 55 gal. drums for over two weeks, during which time they were exposed to humid summer conditions without rehydration. In fact, one could bang pieces against the steel drum in which they had been stored without breaking them.

We have discussed two shaft kiln burning stages. These stages may be consecutively arranged in a single kiln, in which case the lower stage would be the dead burning one and the upper the calcining and preliminary heat treating stage. In this situation, substantially all of the air or oxygen requirements of the upper stage would be premixed with the fuel and introduced at the burning zone in the upper stage. Provision is made for separate, supplemental air introduction to the upper stage, if necessary.

Having thus described the invention in detail and with sufficient particularity as to enable those skilled in the art to practice it, what is desired to have protected by Letters Patent is set forth in the following claims.

We claim:

1. That method of making dead burned basic refractory grain comprising the steps of forming shapes of at least one material of the group consisting of magnesium hydrate, magnesite, dolomite and limestone, and mixtures thereof, having an MgO+CaO content of at least about 97%, the shapes being 90% in the range ¼ to 2 inches, heating these shapes in a shaft kiln stage to a temperature in the range 1600 to 2200° F. to obtain a bulk specific gravity in the range about 1.4 to 2.3, feeding the shapes while still at a temperature above about 1600° F. to a second shaft kiln stage in which a moving bed thereof flows countercurrent to an upwardly moving stream of air, the feed rate of the shapes being on the order of 1 lb. per lb. of air introduced to the bottom of the kiln, introducing sufficient fuel at a dead burning zone intermediate the top and bottom of the shaft kiln to provide about 1 to 2 million B.t.u.'s per ton of dead burned shapes, withdrawing dead burned shapes from the bottom of said kiln, said dead burned shapes having a bulk specific gravity of at least about 3.05.

2. The method of claim 1 in which the shapes are initially heated in a shaft kiln at a temperature in a range between about 1600 to 2000° F.

3. The method of claim 1 in which the shapes are pieces of crude dolomite rock, magnesite rock, and limestone rock.

4. The method of claim 1 in which the shapes are fabricated of dry magnesium hydrate.

5. The method of claim 1 in which the shapes are briquettes made from finely divided 325 mesh material.

References Cited by the Examiner

UNITED STATES PATENTS 3,100,633  8/1963  Norton _____ 263—29
3,221,082  11/1965  Leatham et al. _____ 263—53

FREDERICK L. MATTESON, Jr., *Primary Examiner.*

D. A. TAMBURRO, *Assistant Examiner.*